US009924143B2

(12) United States Patent
Durham et al.

(10) Patent No.: US 9,924,143 B2
(45) Date of Patent: Mar. 20, 2018

(54) WEARABLE MEDIATED REALITY SYSTEM AND METHOD

(71) Applicant: INTEL CORPORATION, Santa Clara, CA (US)

(72) Inventors: Lenitra M. Durham, Beaverton, OR (US); Glen J. Anderson, Beaverton, OR (US); John C. Weast, Portland, OR (US); Giuseppe Raffa, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/494,146

(22) Filed: Sep. 23, 2014

(65) Prior Publication Data

US 2016/0088268 A1    Mar. 24, 2016

(51) Int. Cl.
*H04N 9/31* (2006.01)
*G06F 3/01* (2006.01)
*G06F 1/16* (2006.01)
*G06F 3/041* (2006.01)

(52) U.S. Cl.
CPC ............... *H04N 9/31* (2013.01); *G06F 1/163* (2013.01); *G06F 3/013* (2013.01); *G06F 3/041* (2013.01); *H04N 9/3173* (2013.01); *H04N 9/3179* (2013.01); *H04N 9/3194* (2013.01)

(58) Field of Classification Search
CPC . G06F 3/017; G06F 3/04815; G06K 9/00355; G06K 9/2081
See application file for complete search history.

(56) References Cited

U.S. PATENT DOCUMENTS

| 8,382,295 | B1* | 2/2013 | Kim | H04N 9/31 348/552 |
| 8,558,759 | B1* | 10/2013 | Prada Gomez | G06F 3/017 345/156 |
| 2004/0165284 | A1 | 8/2004 | Holler | |
| 2006/0221266 | A1 | 10/2006 | Kato et al. | |
| 2006/0238617 | A1* | 10/2006 | Tamir | G08B 13/19606 348/143 |
| 2007/0097324 | A1 | 5/2007 | Kikuchi et al. | |
| 2008/0111832 | A1* | 5/2008 | Emam | G02B 27/017 345/633 |
| 2010/0199232 | A1* | 8/2010 | Mistry | G06F 1/163 715/863 |
| 2012/0154557 | A1 | 6/2012 | Perez et al. | |
| 2012/0249741 | A1 | 10/2012 | Maciocci et al. | |
| 2015/0336502 | A1* | 11/2015 | Hillis | B60Q 1/26 701/23 |
| 2016/0028917 | A1* | 1/2016 | Wexler | H04N 5/2257 348/169 |

OTHER PUBLICATIONS

International Search Report and Written Opinion received for PCT Patent Application No. PCT/US2015/046223, dated Dec. 28, 2015, 14 pages.

* cited by examiner

*Primary Examiner* — Kenneth Bukowski

(57) ABSTRACT

Techniques to project an image from a wearable computing device are provided. A wearable computing device including a projector configured to project an image into a user field of view based on output from one or more sensors and/or images captured by a camera. The wearable computing device can also include a touch input device. The wearable computing device can project an image responsive to a users touch based on signals received from the touch input device.

19 Claims, 10 Drawing Sheets

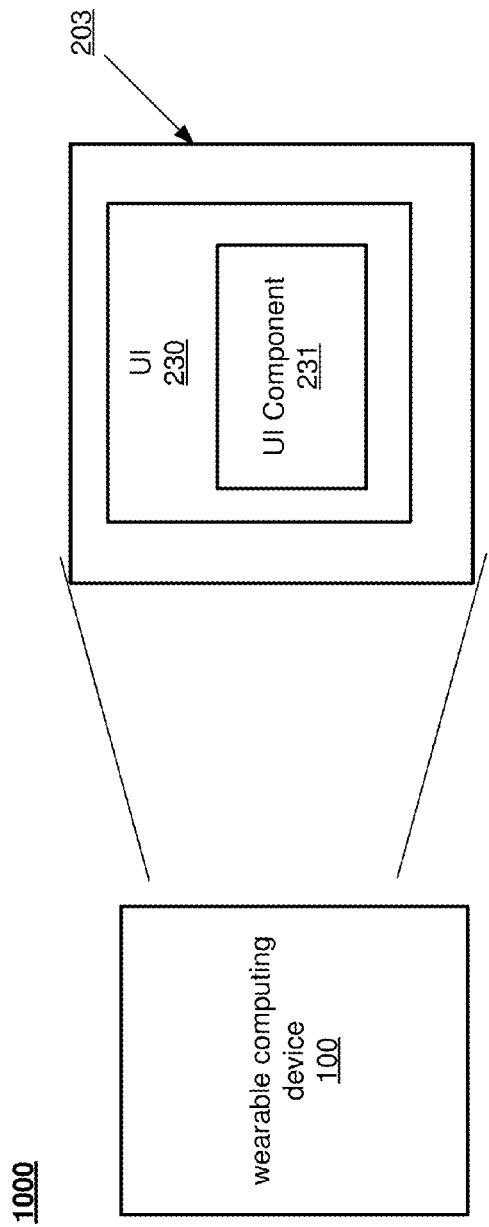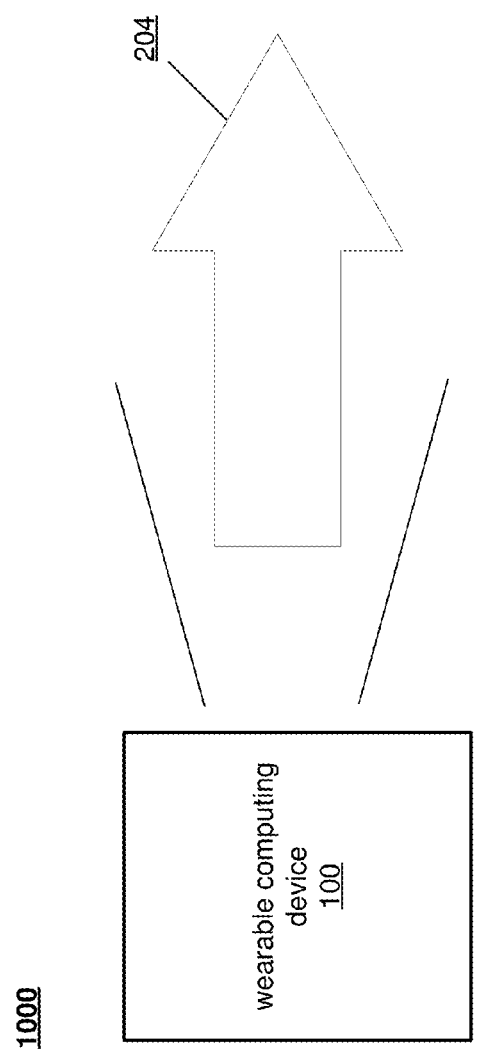

WEARABLE MEDIATED REALITY SYSTEM AND METHOD

BACKGROUND

Modern clothing and other wearable accessories may incorporate computing or other advanced electronic technologies. Such computing and/or advanced electronic technologies may be incorporated for various functional reasons or may be incorporated for purely aesthetic reasons. Such clothing and other wearable accessories are generally referred to as "wearable technology" or "wearable computing devices."

However, wearable devices typically have a significant disadvantage in terms of usable display space. More particularly, the amount of display space available for the user to interact with the device is often limited. This is particularly true for wearable devices, such as, watches, shoes, glasses, earrings, or the like. The limited display space directly affects the functionality and usability of the device.

Projections from a wearable computing device can create a display with significantly larger area than possible with a small wearable display. However, conventional techniques to interact with the projected display require cameras, mirrors, and wearable sensors (e.g., gloves, fingertip sensors, or the like). Such additional equipment can be detrimental to the usability and user experience associated with the wearable computing device.

BRIEF DESCRIPTION OF THE DRAWINGS

FIGS. 2A-2D illustrate examples of portions of the mediated reality system projecting an image.

DETAILED DESCRIPTION

Figure 1:
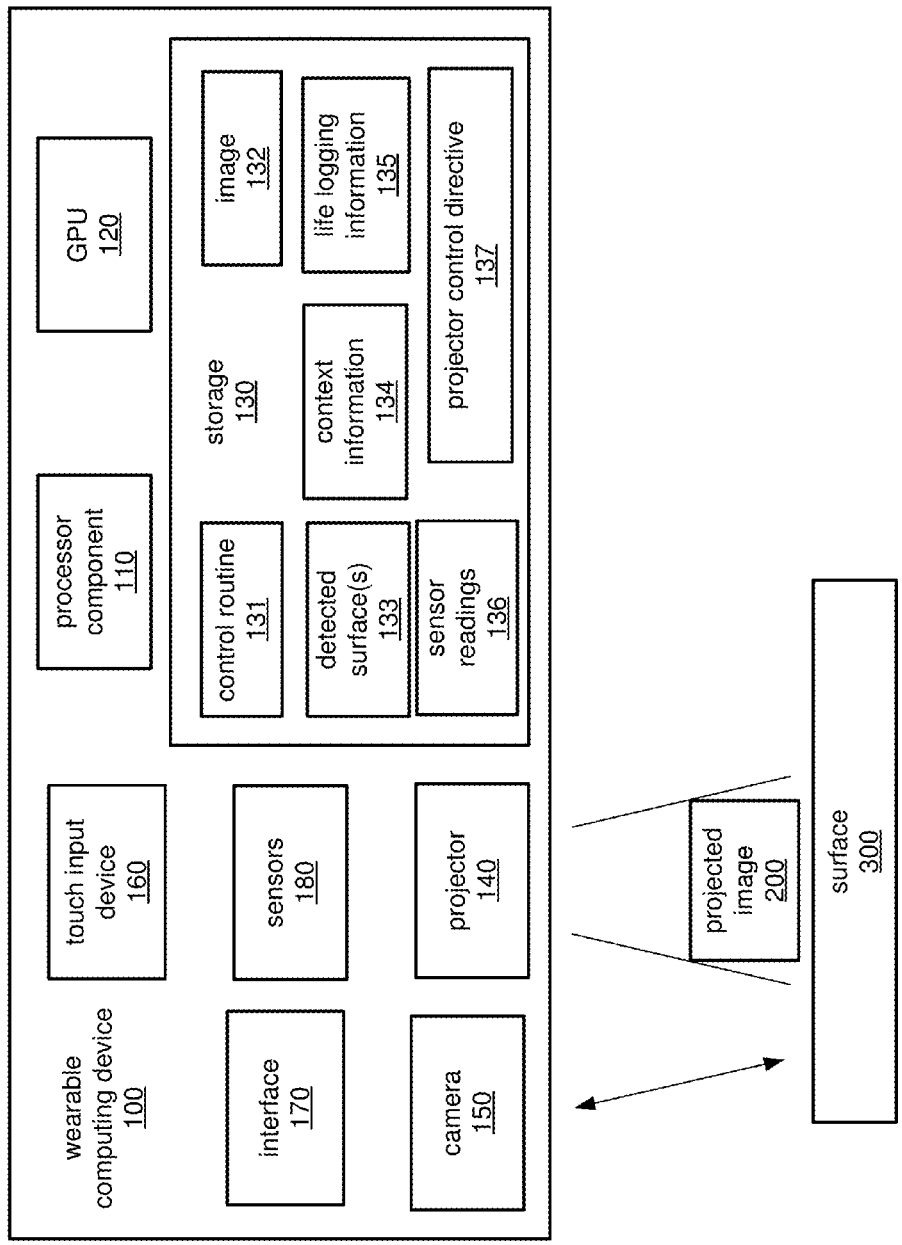
FIG. 1 illustrates an embodiment of a mediated reality system.

Various embodiments are generally directed to a system for creating a mediated reality. Said differently, the present disclosure provides for projecting a display from a wearable computing device and interacting with the display. More particularly, in some examples the present disclosure provides a wearable computing device with a touch input device (e.g., track pad, touch display, or the like) and a projector. During operation, the projector can project a display while the touch input device allows a user to interact with the projected display via the touch input device. As another example, a wearable computing device with a projector is provided. The wearable computing device is configured to project an image onto a surface based on a user context. More specifically, the device is configured to project an image onto a particular surface and at a particular perspective based on the user context, where the particular surface and particular perspective are selected such that the image is projected to be within the users vision at desired time.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a mediated reality system 1000 incorporating a wearable computing device 100. In general, the wearable computing device 100 is depicted configured to project an image on a surface 300, resulting in the projected image 200. More specifically, the computing device 100 is configured to project an image onto a surface (e.g., the surface 300) that is in a visual field. As used herein, a visual field can be a physical range, geographical range, or other range. In particular, the visual field may be a range capable of perception by a human (e.g., one or more human eyes) or by an electronic device (e.g., by a visual input device, or the like). In many example presented herein, for purposes of clarity of presentation, the term visual field is used synonymously with a user's viewpoint. For example the computing device 100 may be configured to generate the projected image 200 within a visual field that corresponds to the viewpoint of a user of the device 100. However, examples are not to be limited in this context.

Furthermore, the wearable computing device 100 can be configured to detect a surface, a context, an object, and/or a touch input, and select and/or generate an image to be projected by the projector based on the detected surface, the context, the object, and/or the touch input. It is important to note, that the surface 300 may be, for example, a wall, a street, a table, or the like. Additionally, the surface 300 may be air or an otherwise transparent or indefinite surface. As such, use of the term "surface" in the context of what the image is projected onto is not to be limiting.

In various embodiments, the wearable computing device 100 incorporates one or more of a processor component 110, a graphics processing component (GPU) 120, a storage 130, a projector 140, a camera 150, a touch input device 160, an interface 170, and sensor(s) 180. The storage 130 stores one or more of a control routine 131, an image 132, detected surface(s) 133, context information 134, life logging information 135, sensor readings 136, and a projector control directive 137.

Although not depicted, the wearable computing device 100 may be operably connected to one or more other computing devices (refer to FIG. 4) via a network. In particular, the wearable computing devices 100 may exchange signals conveying information (e.g., context information, life logging information, display information, touch input information, or the like) with other computing devices (refer to FIG. 4) through the network. Furthermore, as explained in greater detail below, operations described in conjunction with the device 100 and/or data depicted as stored in memory 120 may be performed and/or stored on one or more computing devices communicatively connected to the wearable computing device 100.

In the wearable computing device 100, the control routine 131 incorporates a sequence of instructions operative on the processor component 110 and/or the GPU 120 in their role as a main processor component and/or a GPU to implement logic to perform various functions. In executing the control routine 131, the processor component 110 and/or the GPU 120 determines the image 132 to be projected by the projector 140. In general, the processor component 110 and/or the GPU 120 determine the image 132 based on input from the touch input device 160, context information 134, life logging information 135, and/or sensor readings 136. It is to be appreciated, that a variety of images may be projected by the wearable computing devices. Furthermore, the specific image (e.g., the image 132) will vary based on a number of factors, some of which may be implementation dependent. A few examples are provided here for purposes of presentation; however, they are not intended to be limiting.

In some examples, the processor component 110 and/or the GPU 120 may determine the image 132 based on a particular application that may be executing on the wearable computing device. For example, the wearable computing device may be configured to execute one or more applications, such as, for example, an email application, a contact management application, a web browser, a mapping application, a fitness application, an augmented reality application, or the like. The processor component 110 and/or the GPU 120 may determine the image 132 based on one or more user interface components of the application.

In executing the control routine 131, the processor component 110 and/or the GPU 120 causes the projector 140 to project the image 132 onto the surface 300, resulting in the projected image 200. In general, the processor component 110 and/or the GPU 120 cause the projector 140 to project the image onto a particular surface (e.g., the surface 300) and with the right characteristics (e.g., orientation, color, keystone correction, brightness, or the like) to be within a user's viewpoint at the right time.

Example images, determination of an image by the processor component 110 and/or the GPU 120, and selection of a particular surface by the processing component 110 are described in greater detail below. However, prior to describing such operations, it is beneficial to describe examples of (i) generating the context information 134 and (ii) generating the life logging information 135.

Generating Context Information

In some examples the processor component 110 and/or the GPU 120 may determine the image 132 based on the context information 134. Additionally, the processor component 110 may determine the surface 300 and/or the method or form for projecting the image 132 onto the surface 300 based on the context information 134. In general, the context information 134 may include indications of a particular "context" of the wearable computing device 100 and/or the user of the wearable computing device and/or surrounding environment. In particular, the context information 134 may include indications of an activity level, a social setting, a location, proximate computing device(s), an environment of a device or a user, a user characteristic (e.g., height, weight, disabilities, etc.), user movement, date/time parameters, transportation parameters (e.g., automotive vehicle, airplane, bicycle, etc.), device characteristics, proximate users, safety parameters, security parameters, authentication parameters, sensor information, or the like.

In some examples, the processing component 110 may determine the context information 134 from sensors readings 136. The sensor readings 136 can correspond to one or more signals, readings, indications, or information received from the sensors 180. In some examples, the sensors 180 may include an accelerometer. In executing the control routine 131, the processing component 110 may receive output from the accelerometer and store the output as the sensor reading 136. The context information 134 then, may include an indication of an activity level (e.g., ranging between not moving and running, or the like) determined based in part on the output from the accelerometer.

In some examples, the sensors 180 may include a microphone. In executing the control routine 131, the processing component 110 may receive output from the microphone and store the output at the sensor readings 136. The context information 134 then, may include an indication of a social setting (e.g., at home, on the subway, in the car, at the office, or the like) determined based in part on the output from the microphone.

In some examples, the sensors 180 may include a light sensor. In executing the control routine 131, the processing component 110 may receive output from the light sensor and store the output at the sensor readings 136. The context information 134 then, may include an indication of an ambient light determined based in part on the output from the light sensor.

It is important to note, that the sensor 180 may be a sensor array, and can include any number or sensors. Furthermore, one or more of the sensors 180 may be disposed within the wearable computing device 100 (e.g., as shown in FIG. 1) and one or more of the sensors 180 may be disposed outside the wearable computing device 100. In particular, the wearable computing device 100 may be communicatively coupled to sensors 180 (e.g., proximity beacons, weather stations, the Internet of Things, or the like) to receive output and signals (e.g., including indications of sensor readings) from the sensors 180.

In some examples, the processor component 110 may determine the context information 134 from output received from the camera 150. For example, the processor component 110 may receive output from the camera including indications of images captured by the camera 150 and store the images as sensor readings 136. The context information 134 then, may include an indication of a privacy level (e.g., in a group, with one or more known individuals, alone, or the like) determined based in part on images captured from the camera 150.

Generating Life Logging Information

In some examples, the processing component 110 may determine the life logging information 135 from sensor readings 136 and/or camera output 150. For example, as noted above, the sensor readings may include indications of images captured by the camera 150. The processing component 110 may determine the life logging information 135 based in part on the images. For example, the processor component 110 may identify locations visited, placement of items (e.g., keys, remote control, wallet, or the like) and store indications of such information as life logging information 135.

In some examples, the sensors 180 may include a global positioning system (GPS) sensor. In executing the control routine 131, the processing component 110 may receive output from the GPS sensor and store the output as the sensor readings 136. The life logging information 135 then, may include an indication of GPS tracks, areas visited, time at particular locations, or the like, determined based in part on the output from the GPS sensor.

In some examples, the processor component 110 may determine the life logging information 135 from output received from the camera 150. For example, the life logging information 135 may include an indication of a location where an item (e.g., keys, wallet, remote control, or the like) were last seen determined based in part on images captured from the camera 150.

Image Projection

As noted above, the processing component 110 and/or the GPU 120 determine the image 132. Additionally, the processing component 110 selects the surface to project the image 1232 onto as well as determines various projection characteristics. For example, the processing component 110 and/or the GPU 120 may determine the image 132 based on one or more user interface elements of an application, the context information 134, and/or the life logging information 135.

The processing component 110 and/or the GPU 120 may generate the image 132 to include a user interface for an application. Furthermore, the processing component 110 and/or the GPU 120 may be configured to generate the image 132 based on input received from the touch input device 160. For example, the image 132 can include a user interface for an email application. The processing component 110 and/or the GPU 120 can generate the image 132 based on the user interface for the email application and signals, including an indication of a touch input, received from the touch input device 160. More particularly, the image 132 may include the user interface for the email application and may dynamically change based on input from the touch input device.

In some examples, the processing component 110 and/or the GPU 120 may be configured to generate the image 132 based on the life logging information 135. For example, the image 132 can include an indicator (e.g., arrow, star, outline, label, or the like) to be projected over, around, or adjacent to one or more real object(s). In such a manner, the wearable computing device 100 may provide an augmented reality, and particularly, an augmented reality with minimal intrusion to actual reality. For example, the processing component 110 and/or the GPU 120 can generate the image 132 to highlight objects whose last known location is recorded in the life logging information 135. As another example, the processing component 110 and/or the GPU can generate the image 132 to retrace a pathway or course recorded in the life logging information 135.

In some examples, the processing component 110 and/or the GPU 120 may be configured to generate the image 132 based on the context information 134. For example, the image 132 can include a user interface for a fitness application. The processing component 110 and/or the GPU 120 can generate the image 132 based on the user interface for the fitness application and the context information 134. In particular, the image 132 may include the user interface for the fitness application with components of the user interface changing based on the context information. For example, the user interface may include a "repetition counter" (e.g., to count up, count down, or the like) with the count changing based on the context information 134. As noted above, the context information 134 may include indications of movement based on signals received from the sensors 180.

Accordingly, the context information 134 may include the number of times a repetitive movement has occurred (e.g., based on signals received from the sensors 180). Such information can be represented in the image 132. In a particularly specific example, the context information 134 may be representative of the number of repetitions of an exercise (e.g., sit-ups, pushups, pull-ups, squats, bench press, or the like) completed. The processing component 110 and/or the GPU 120 may be configured to generate the image 132 including an indication of the number of repetitions. For example, the image 132 may include the number of repetitions completed, the number of repetitions left in a set of known repetitions, or the like.

In some examples, the processing component 110 and/or the GPU 120 may be configured to generate the image 132 based on the context information 134. For example, the image 132 can include a user interface for a mapping application. The processing component 110 and/or the GPU 120 can generate the image 132 to include an indicator (e.g., arrow, or the like) to be projected to indicate a direction or pathway to take based on location information (e.g., GPS location, street recognition information, or the like) in the context information 134. The processing component 110 and/or the GPU 120 may dynamically change the image 132 based on changing context information (e.g., changing location, or the like).

In executing the control routine 131, the processing component 110 detects a number of surfaces (e.g., the surface 300) adjacent to the wearable device 100. In some examples, the processor component 110 may receive signals from the camera 150, including indications of surfaces adjacent to the wearable computing device 100. In particular, the processor component 110 may detect a wall, a table, a floor, a road, a building, an edge of a desk, or the like as surfaces adjacent to the wearable computing device 100. Said differently, the processing component 110 may receive output from the camera 150 and detect a number of surfaces adjacent to the wearable computing device based at least in part on the output. Additionally, the processing component 110 may store indications of the detected surfaces as detected surfaces 133. In some examples, the processing component 110 may detect the surface as a point in space (e.g., air) based on the context information 134 and/or sensor readings 136. In particular, the processing component 110 may detect a point in space from indication of the location of a user's head, direction of a user's eyes, or the like included in context information 134 and/or sensor readings 136.

In executing the control routine 131, the processing component 110 determines a surface to project the image 132 onto. More particularly, the processing component 110 determines the surface 300 onto which the image 132 is to be projected. In general, the processing component 110 determines the surface 300 from the detected surfaces 133. In some examples, the processing component 110 determines the surface 300 based on projector 140. For example, the processing component 110 may determine the surface 300 based on the detected surfaces 133 and the types of surfaces (e.g., flat, matte, coloring, or the like) the projector 140 is capable of projecting onto. In some examples, the projector 140 may be a holographic projector. As such, the detected surfaces 133 may include air, glass, or a surface that other types (e.g., LCD, CRT, or the like) of projector may not suitable project onto.

In some examples, the processing component 110 may determine the surface 300 from the detected surfaces based on the contents of the image 132; and the context information 134 and/or life logging information 135. For example, if the image 132 contains a mapping application, the processing component 110 may determine the surface 300 based on a movement rate indicated in the context information 134 and/or a user's viewpoint indicated in the context information 134. In particular, the processing component 110 may determine the surface to be a road, a building wall, or the like. Additionally, the processing component 110 may adjust the focus and/or resolution of the projected image 200 based on the context information 134. For example, if the context information indicates the user's head is moving (e.g., the user is doing sit-ups, or the like) the processing component 110 may dynamically adjust the focus of the projected image 200 so that the image will stay in focus to the user as the user's head moves.

As another example, if the image 132 contains private and/or confidential information, the processing component 110 may determine the surface 300 based on a social setting and/or a user's viewpoint indicated in the context information 134. In particular, the processing component 110 may determine the surface 300 to be a surface viewable by the user but not by others in the social setting.

In executing the control routine 131, the processing component 110 generates the projector control directive 137. In general, the projector control directive 137 directs the projector 140 to project the image 132 on to the surface 300, resulting in the projected image 200. In some examples, the processing component 110 may generate the projector control directive 137 to include indications of an orientation to project the image 132. In some examples, the processing component 110 may generate the projector control directive 137 to include indications of a color for the image 132. In some examples, the processing component 110 may generate the projector control directive 137 to include indications of a keystone correction for the image 132. In some examples, the processing component 110 may generate the projector control directive 137 to include indications of an optimal color palate for the image 132.

In some examples, the processing component 110 may generate the projector control directive 137 to conserve power used to project the image. In particular, the processing component 110 may generate the projector control directive 137 such that the projected image 200 is displayed for the user viewpoint in such a manner that power consumption is reduced. For example, a user performing exercise may periodically look away from the surface 300 (e.g., during a portion of a repetition, every other stride while running, or the like). As such, the projector control directive 137 may cause the projector 140 to periodically project the image 132. In particular, the projector 140 can project the image 132 during a period when the user is expected to be looking at the surface 300 and not project the image 132 when the user is not expected to be looking at the surface 300.

In various embodiments, the processor component 110 and/or the processor components 210 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the GPU 120 may include any of a wide variety of commercially available graphics processing units. Further, one or more of these graphics processing units may have dedicated memory, multiple-threaded processing and/or some other parallel processing capability.

In various embodiments, the storage 130 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the projector 140 may include any of a variety of projectors, such as, for example, LCD projectors, CRT projector, LED projectors, DLP projectors, holographic projectors, or the like.

In various embodiments, the camera 150 may be any of a variety of cameras that include an electronic sensor configured to capture an image, including 3D cameras.

In various embodiments, the touch input device 160 may be any of a variety of devices configured to generate an output in response to a users touch. For example, the touch input device 160 may be a capacitive touch device, an electro-mechanical touch device, or the like.

In various embodiments, the interface 170 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.11n, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

In various examples, the sensor(s) 180 may include one or more sensors, such as, for example, an accelerometer, a microphone, a gyroscope, a GPS sensor, a magnetic sensor, or the like.

FIGS. 2A-2D illustrates example projected images 200 that may be projected by the projector 140 based on the projector control directive 137 and the image 132. In general, the image 132 includes indications of the projected image 200. In particular, the image 132 includes data necessary for the projector 140 to project light resulting in the projected image 200 being displayed on the surface 300.

Figure 2A:
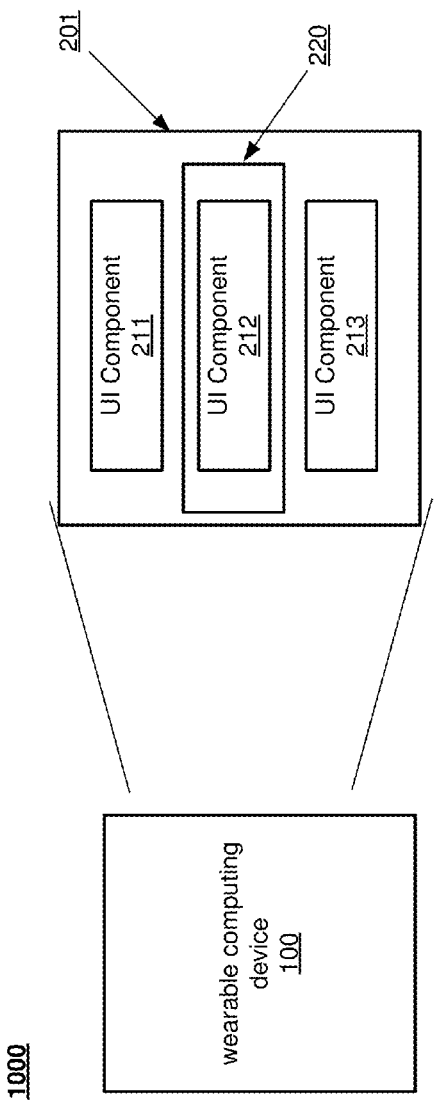

Turning more specifically to FIG. 2A, an example projected image 201, which may be projected by the projector 140 based on the image 132 and the projector control directive 137, is shown. As depicted, the projected image 201 includes a user interface (UI) 210 having UI components 211, 212, and 213. In the context of an email application, the UI components 211, 212, and 213 may correspond to emails in a mailbox. The projected image 201 also includes a highlighted section 220. The highlighted section 220 may dynamically change based on signals received from the touch input device 160. For example, a user may "scroll" through the UI components 211, 212, and 213 using the touch input device 160.

Figure 2B:
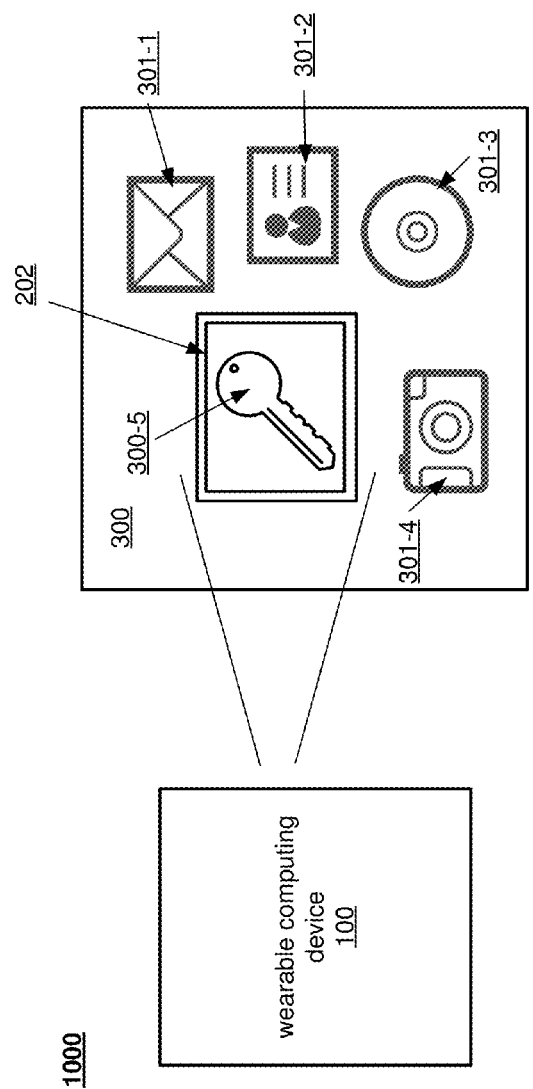

Turning more specifically to FIG. 2B, another example projected image 202, which may be projected by the projector 140 based on the image 132 and the projector control directive 137, is shown. As depicted, the projected image 202 may be projected around an object 301. In particular, a number of objects (e.g., 301-1, 301-2, 301-3, 301-4, and 301-5) are shown on the surface 300. The processor component 110 may be configured to recognize one of the objects 301 and project the image onto, over, around, or adjacent to the recognized object. For example, the image 202 is depicted projected onto the surface 300 around the object 301-5. As such, the wearable computing device 100 may "highlight" or "point to" an object for the user, such as, the users keys.

Turning more specifically to FIG. 2C, another example projected image 203, which may be projected by the projector 140 based on the image 132 and the projector control directive 137, is shown. As depicted, the image 203 includes a user interface (UI) 230 having a UI component 231. In the context of a fitness application, the UI component 231 may correspond to a repetition counter, a timer, or the like. The UI component 231 may dynamically change based on context information 134 (e.g., detected movement, elapsed time since movement started, or the like). For example, the UI component 231 may dynamically change so the user can see the number of reps and/or the elapsed time of activity.

Turning more specifically to FIG. 2D, another example projected image 204, which may be projected by the projector 140 based on the image 132 and the projector control directive 137, is shown. As depicted, the projected image 204 is an indicator (e.g., the arrow), which may be projected onto the surface 300. For example, in the context of a mapping application, the indicator may be projected onto the surface (e.g., a sidewalk, or the like) to provide a visual indication of the direction to travel. The indicator may dynamically change (e.g., to a curved arrow, to a stop sign, or the like) based on context information 134 (e.g., detected movement, detected position, or the like).

Figure 3:
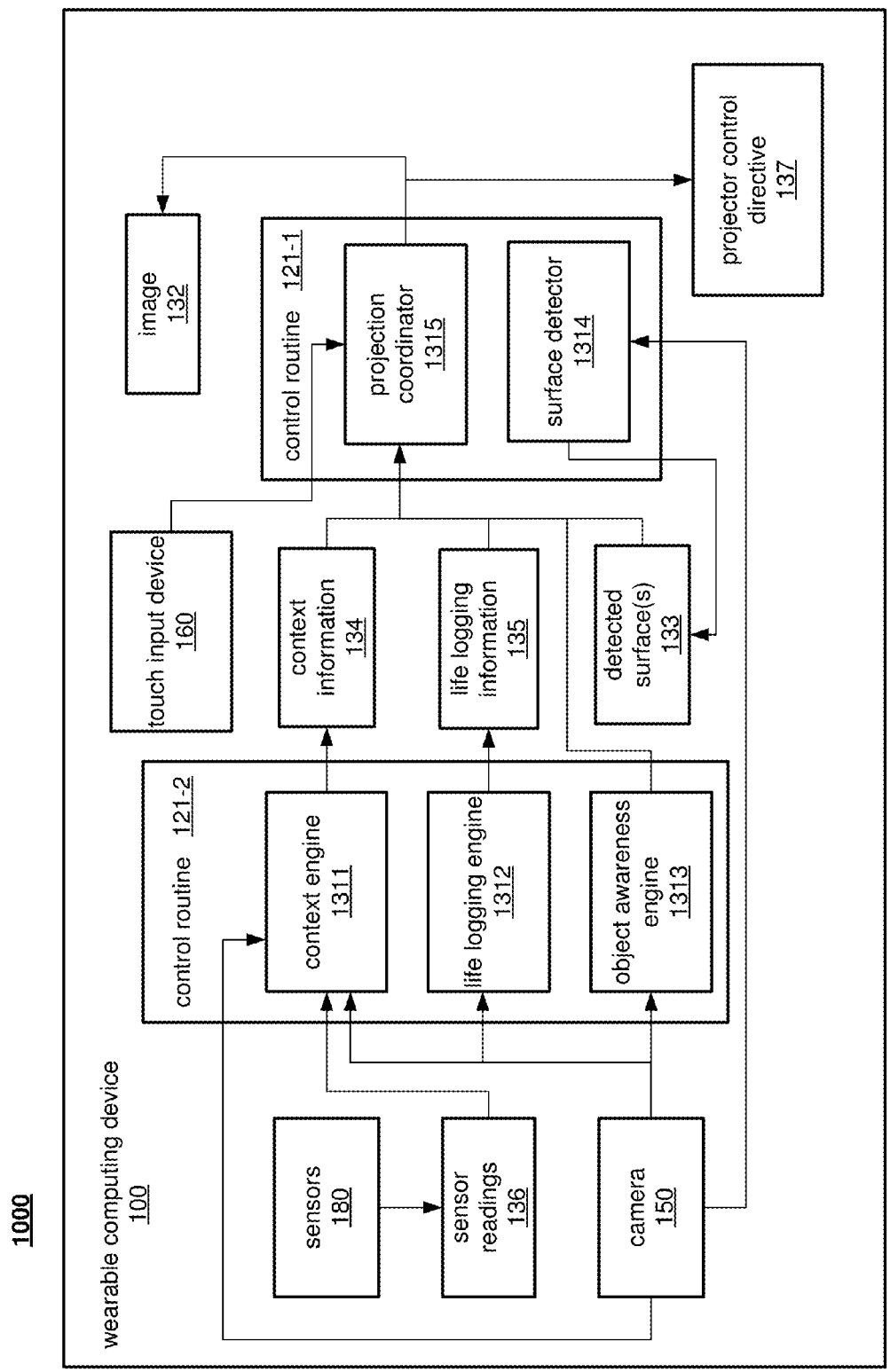
FIG. 3 illustrates an example of a portion of the mediated reality system of FIG. 1.

FIG. 3 is a block diagram of portions of an embodiment of the mediated reality system 1000 of FIG. 1. In general, FIG. 3 illustrates aspects of the operation of the system 1000. In various embodiments, the control routine 131 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor component 110 and/or GPU 120. Where one or more device drivers are included, those device drivers may provide support for any of a variety of other components, whether hardware or software components, of the wearable computing system 100.

As depicted in FIG. 3, the control routine 131 (e.g., the control routine 131-1) includes a surface detector 1314 and a projection coordinator 1315. Additionally, in some examples, the control routine 131 (e.g., the control routine 131-2) includes a context engine 1311, a life logging engine 1312, and an object awareness engine 1313. It is important to note, that with some embodiments, the generation of the context information 134 and life logging information 135 as well as object recognition and tracking can be performed by another computing device (refer to FIG. 4.) For example, a computing device communicatively connected to the wearable computing device (e.g., via a wireless network, or the like) may perform more computationally intensive operations. Furthermore, some information (e.g., context information 134 and/or life logging information 135 may be stored on another computing device, for example, to conserve available memory on the wearable computing device 100.

In general, the control routine 131 causes the image 132 to be projected onto the surface 300, resulting in the projected image 200. In particular, the control routine 131 detects a surface, a context, an object, and/or a touch input. The control routine 131 generates an image to be projected by the projector onto a particular surface and with particular characteristics to be viewable by a user. The image, surface, and characteristics are determined based on the detected surface, the context, the object, and/or the touch input.

The projection coordinator 1315 generates the projector control directive 137 based on the context information 134, which includes an indication of a context of the wearable computing device 100. In particular, the context includes information regarding a context of the device 100 based on output from the sensors 180 (e.g., the sensor readings 136). The projector control directive 137 causes the projector 140 to project to image 132 onto the surface 300, resulting in the projected image 200 being within a user view and/or focus.

In some examples, the projection coordinator 1315 generates the projector control directive based on the context information 134 and output from the touch input device 160. More particularly, the projection coordinator 1315 may allow a user to interact with the projected image 200 through the touch input device 160.

In some examples, the projection coordinator 1315 determines a surface to project the image onto (e.g., the surface 300). In particular, the projection coordinator 1315 can determine the surface from one or more surfaces detected by the surface detector. The surface detector 1314 detects one or more surfaces adjacent to the apparatus. In some examples, the surface detector 1314 detects surfaces adjacent to the device 100 based on images captured from the camera 150. The projection coordinator 1315 may determine the surface to project the image onto, based on indications of a user's viewpoint. In particular, the context may include an indication of user's viewpoint, for example, based on sensor readings 136 and/or images captured by the camera 150.

In some examples, the projection coordinator 1315 determines (i) a user's viewpoint and (ii) a surface within the user's viewpoint. For example, the projection coordinator 1315 may determine a user's viewpoint from sensor output and/or signals received from various devices used to track a user's viewpoint. In particular, the projection coordinator 135 may determine the user's viewpoint from signals received from an eye tracking device, a head-worn camera, and/or a detectable projection of light (e.g., detected by a light detector, or the like).

Additionally, the projection coordinator 1315 may determine one or more characteristics for projecting the image, such as, for example, an orientation, a keystone correction, and an optimal color palette, or the like. Such characteristics may be based on the context information 134, life logging information 135, or other information. The projector control directive 137 may include these characteristics to cause the projector 140 to project the image 132 with the desired characteristics.

In some examples, the context is an activity level. For example, the sensors 180 may include an accelerometer. As such, the context information 134 can include an indication of an activity level based on signals received from the accelerometer. In some examples, the context information 134 may be based on an image captured from a camera. In particular, the context information can include an indication of a social setting, such as may be determined based on image analysis techniques (e.g., face recognition, location recognition, or the like) applied to an image captured by the camera 150.

In some examples, the sensors 180 include a global positioning system (GPS) sensor. In such examples, the context information 134 can include an indication of a location of the device 100.

With some examples, the control routine 131 includes the context engine 1311. In such examples, the context engine may be configured to receive the context information 134 from a network connected computing device. As another example, the context engine 1311 may be configured to determine the context information 134 based on the sensor readings 136 and or images captured by the camera 150.

In some examples, the projection coordinator 1315 generates the projector control directive 137 based on the life-logging information 135. In general, the life-logging information 135 including an indication of a history of the device 100 based at least in part on the sensor readings 136 and/or images captured by the camera 150. In particular, the life logging information 135 may include a history of location visited by the device 100, places where specific objects are placed, or the like.

With some examples, the control routine includes the life logging engine 1312. In such examples, the life logging engine 1312 may be configured to receive the life logging information 135 from a network connected computing device. As another example, the life logging engine 1312 may be configured to determine the life logging information 135 based on the sensor readings 136 and/or images captured by the camera 150.

With some examples, the control routine 131 may include an object awareness engine 1313. In general, the object awareness engine is configured to identify or recognize objects in images captured by the camera 150. For example, the object awareness engine 1313 may detect a specific item (e.g., keys, wallet, glasses, remote control, or the like) in images captured by the camera 150. Accordingly, the object awareness engine 1313 may be configured to detect object viewed, or within the view, of a user or wearer of the device 100.

Figure 4:
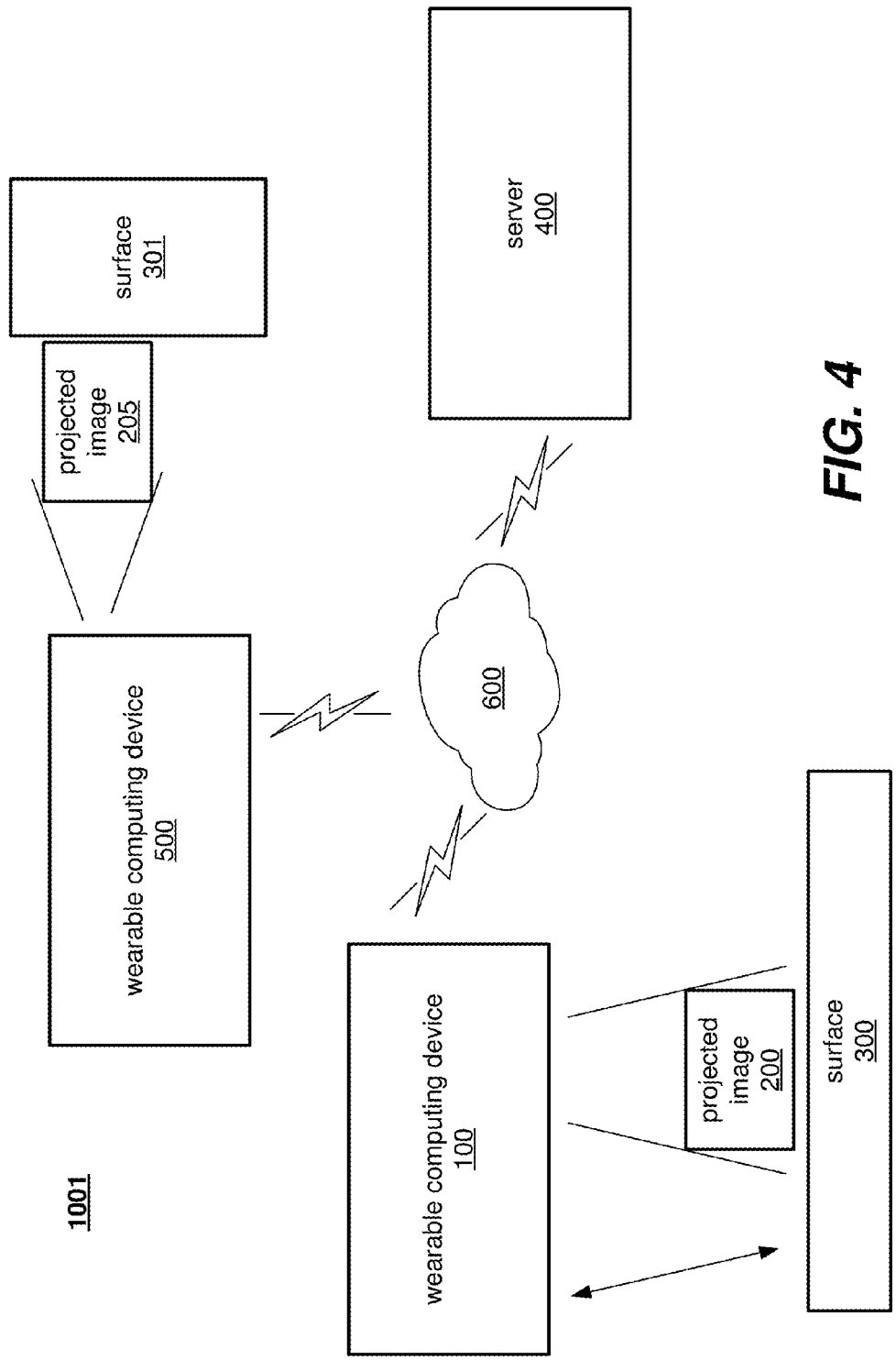
FIG. 4 illustrates another embodiment of a mediated reality system.

FIG. 4 illustrates a mediated reality system 1001. As depicted, the system 1001 includes the wearable computing device 100 configured to project an image onto the surface 300, resulting in the projected image 200. Additionally, the system 1001 includes a server 400 and a second wearable computing device 500 communicatively coupled to the wearable computing device 100 through network 600. The system 1001 is described in conjunction with the system 1000 of FIGS. 1 and 3. Additionally, the second wearable computing device 500 may be substantially similar to the wearable computing device 100 described above. In particular, the second wearable computing device 500 is depicted projecting an image onto a surface 301, resulting in the projected image 205.

In general, the server 400 may be configured to receive sensor readings 136 from the wearable computing device 100 and/or the second wearable computing device 500 and determine the context information 134 and the life logging information 135. Additionally, the server 400 may be configured to recognize objects within images captured by the camera 150 of the wearable computing device 100 and/or 500.

The wearable computing device 100 may be configured to generate the image 132 and the projector control directive 137 as described above. Furthermore, the wearable computing device 100 may be configured to generate the image 132 and the projector control directive 137 in coordination with the second wearable computing device 500. More specifically, the server 400 may be configured to determine the context information 134 and the life logging information 135 based on sensor readings from both the device 100 and the device 500. As such, the wearable computing device 100 may generate the image 132 and the projector control directive 137 based on sensor readings from both the devices 100 and 500. Furthermore, the wearable computing device 100 may generate the image 132 and the projector control directive 137 based on projection capabilities of the device 500, surfaces adjacent to the device 500, or the like.

In some examples, the devices 100 and 500 may coordinate the projection of images onto the same surface. More particularly, the surface 300 and the surface 301 may be the same surface on some examples.

Figure 5:
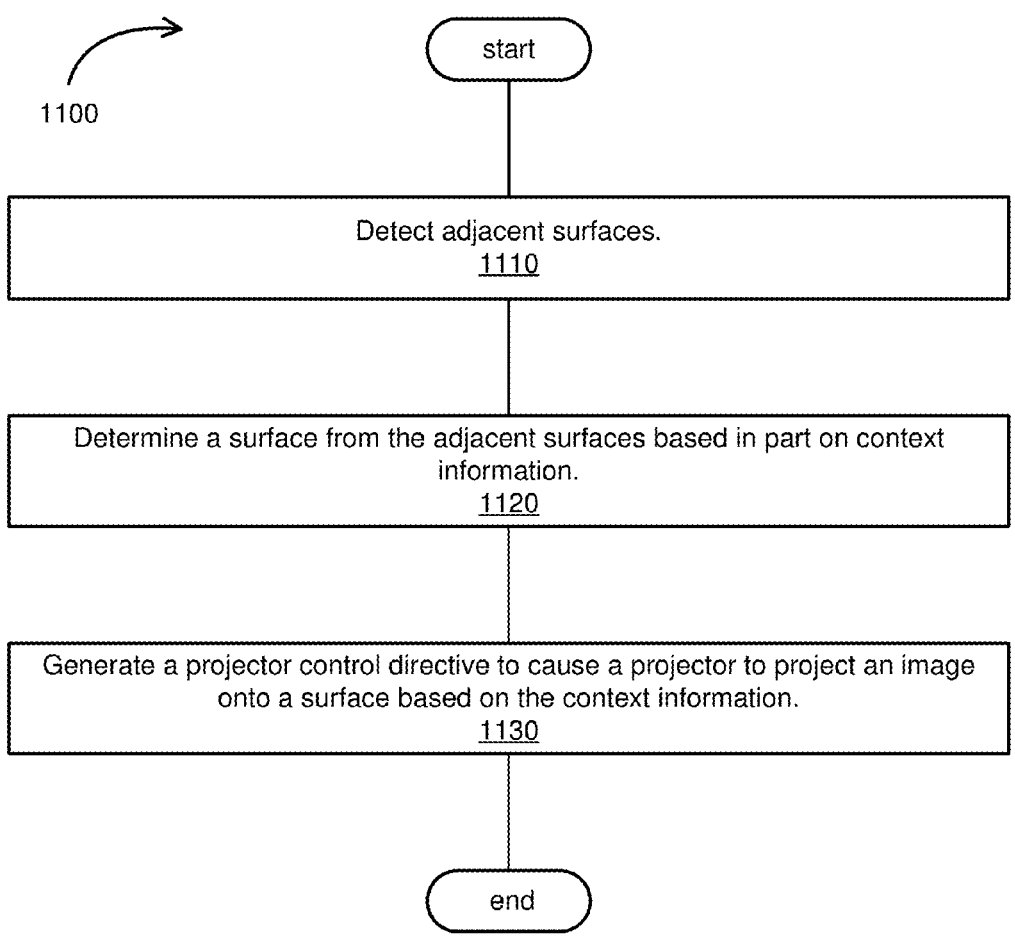
FIGS. 5-7 illustrate examples of logic flows according to embodiments.
Figure 6:
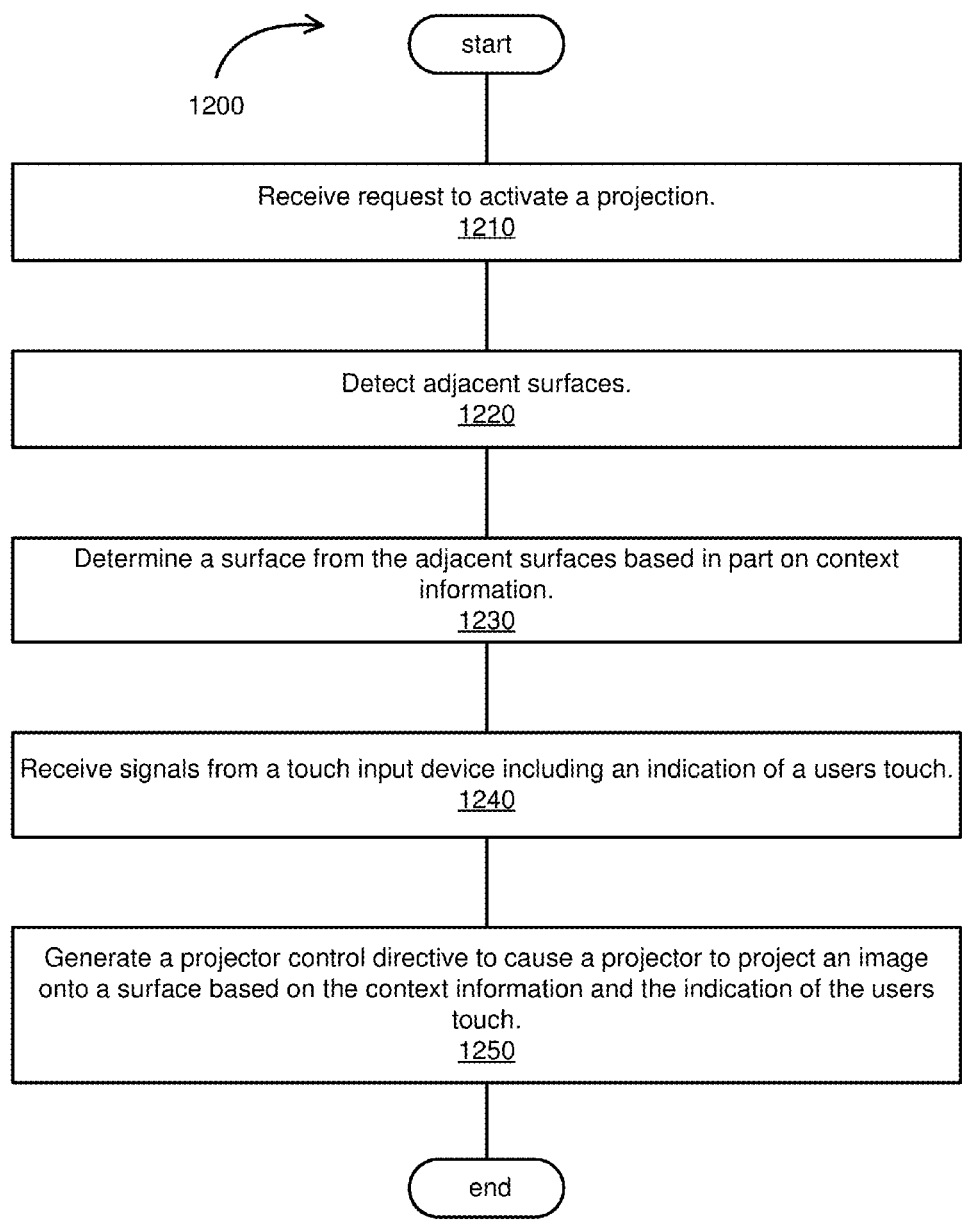
Figure 7:
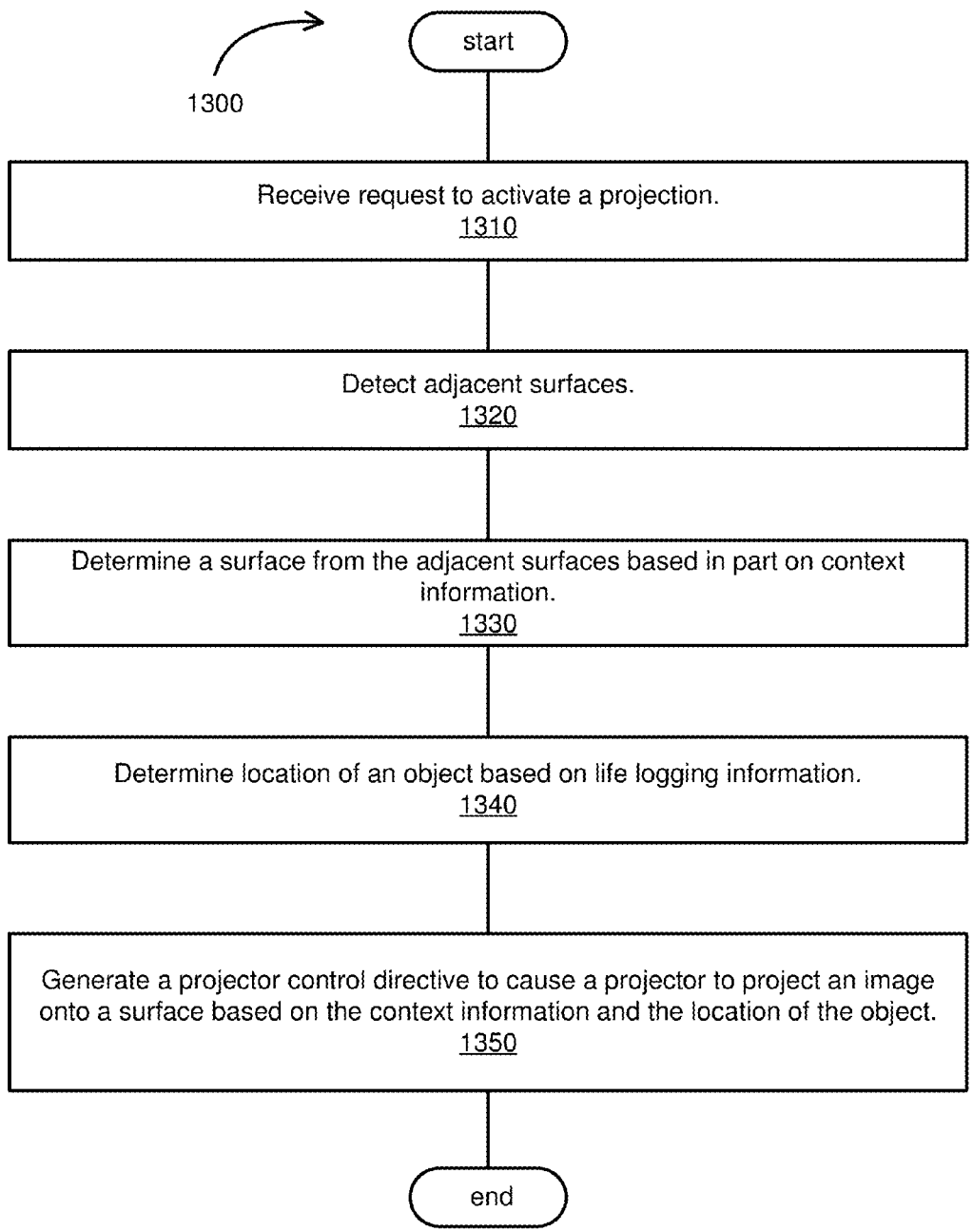

FIGS. 5-7 illustrate example embodiments of logic flows that may be implement by components within the system 1000. The illustrated logic flows may be representative of some or all of the operations executed by one or more embodiments described herein. More specifically, the logic flows may illustrate operations performed by the processor components 110 and/or the GPU 120 in executing at least the control routines 131. Although the logic flows are described with reference to FIGS. 1, 2A-2D, and 3, examples are not limited in this context.

Turning more specifically to FIG. 5, a logic flow 1100 is depicted. The logic flow 1100 may begin at block 1110. At block 1110, a processor component of a wearable computing device of a mediated reality system (e.g., the processor component 110 of the wearable computing device 100 of the system 1000) detects adjacent surfaces. For example, the wearable computing device 100 may be caused by execution of the projection coordinator 1315 of the control routine 131 to detect adjacent surfaces, including the surface 300 and store indications of the adjacent surfaces as the detected surfaces 133.

Continuing to block 1120, the processor component of the wearable computing device determines a surface from the detected surfaces based in part on context information. For example, the projection coordinator 1315 may determine the surface 300 from the detected surfaces 133 based on the context information 134. In particular, the projection coordinator 1315 can determine the surface 300 based on the context information 134, including an indication of a user's viewpoint and/or focus such that the projected image 200 is within the user's viewpoint and focus.

Continuing to block 1130, the processor component of the wearable computing device generates a projection control directive to cause a projector to project an image onto the determined surface. For example, the projection coordinator 1315 can generate the projector control directive 137 to cause the projector 400 to project the image 132 onto the surface 300.

Turning more specifically to FIG. 6, a logic flow 1200 is depicted. The logic flow 1200 may begin at block 1210. At block 1210, a processor component of a wearable computing device of a mediated reality system (e.g., the processor component 110 of the wearable computing device 100 of the system 1000) receives a request to activate a projection. For example, the projection coordinator 1315 may receive a request (e.g., via voice command, via motion gesture, via touch gesture, via button press, or the like) to activate projection features of the wearable computing device 100.

Continuing to block 1220, the processor component of the wearable computing device detects adjacent surfaces. For example, the wearable computing device 100 may be caused by execution of the projection coordinator 1315 of the control routine 131 to detect adjacent surfaces, including the surface 300 and store indications of the adjacent surfaces as the detected surfaces 133.

Continuing to block 1230, the processor component of the wearable computing device determines a surface from the detected surfaces based in part on context information. For example, the projection coordinator 1315 may determine the surface 300 from the detected surfaces 133 based on the context information 134. In particular, the projection coordinator 1315 can determine the surface 300 based on the context information 134, including an indication of a user's viewpoint and/or focus such that the projected image 200 is within the user viewpoint and focus.

Continuing to block 1240, the processor component of the wearable computing device receives signals from a touch input device including an indication of a users touch. For example, the projection coordinator 1315 may receive signals form the touch input device 160. Continuing to block 1250, the processor component of the wearable computing device generates a projection control directive to cause a projector to project an image onto the determined surface, the image responsive to the received indication of the users touch. For example, the projection coordinator 1315 can generate the projector control directive 137 to cause the projector 400 to project the image 132 onto the surface 300, where the projected image 200 is responsive to the users touch (e.g., signals received from the touch input device 160.)

Turning more specifically to FIG. 7, a logic flow 1300 is depicted. The logic flow 1300 may begin at block 1310. At block 1310, a processor component of a wearable computing device of a mediated reality system (e.g., the processor component 110 of the wearable computing device 100 of the system 1000) receives a request to activate a projection. For example, the projection coordinator 1315 may receive a request (e.g., via voice command, via motion gesture, via touch gesture, via button press, or the like) to activate projection features of the wearable computing device 100.

Continuing to block 1320, the processor component of the wearable computing device detects adjacent surfaces. For example, the wearable computing device 100 may be caused by execution of the projection coordinator 1315 of the control routine 131 to detect adjacent surfaces, including the surface 300 and store indications of the adjacent surfaces as the detected surfaces 133.

Continuing to block 1330, the processor component of the wearable computing device determines a surface from the detected surfaces based in part on context information. For example, the projection coordinator 1315 may determine the surface 300 from the detected surfaces 133 based on the context information 134. In particular, the projection coordinator 1315 can determine the surface 300 based on the context information 134, including an indication of a user's viewpoint and/or focus such that the projected image 200 is within the user's viewpoint and focus.

Continuing to block 1340, the processor component of the wearable computing device determines a location of an object based on life logging information. In particular, the processor component determines a location of an object within a users field of view. For example, the object awareness engine 1313 may recognize an object in images captured by the camera 150 and determine a location of the object within the captured images and/or a users field of view. Continuing to block 1250, the processor component of the wearable computing device generates a projection control directive to cause a projector to project an image onto the determined surface, the image highlighting the location of the recognized object. For example, the projection coordinator 1315 can generate the projector control directive 137 to cause the projector 400 to project the image 132 onto the surface 300, where the projected image highlights the location of the recognized object.

Figure 8:
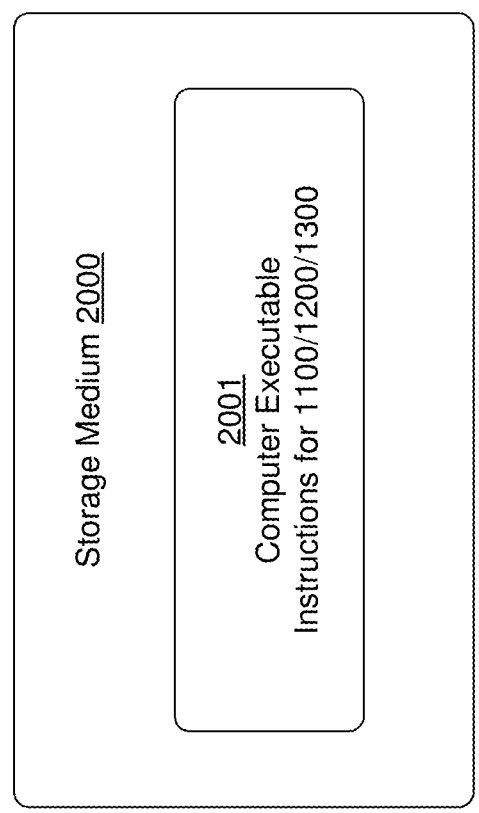
FIG. 8 illustrates a storage medium according to an embodiment.

FIG. 8 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions 2001, such as instructions to implement logic flows 1100, 1200, and/or 1300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
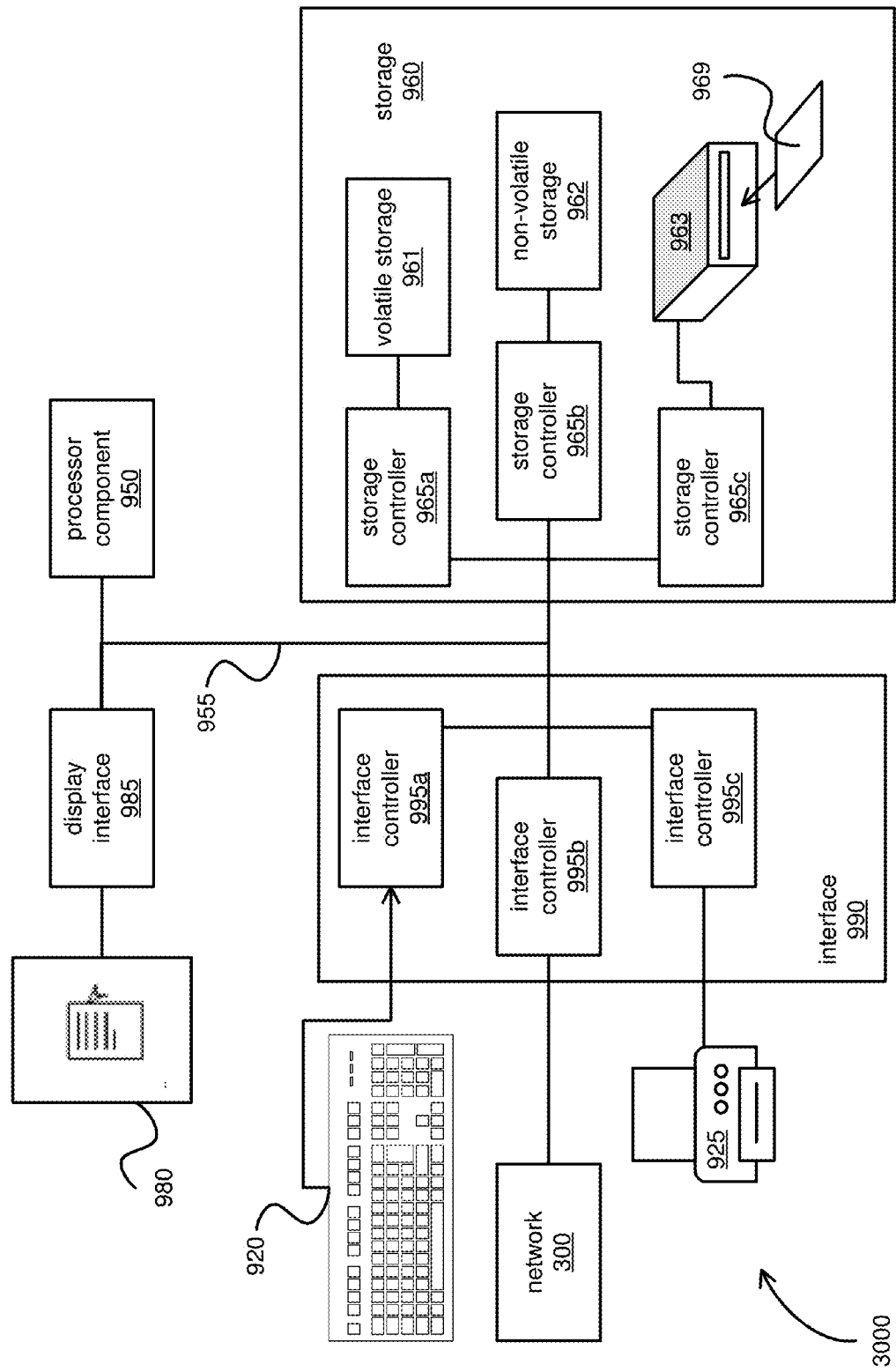
FIG. 9 illustrates a processing architecture according to an embodiment.

FIG. 9 illustrates an embodiment of an exemplary processing architecture 3000 suitable for implementing various embodiments as previously described. More specifically, the processing architecture 3000 (or variants thereof) may be implemented as part of the wearable computing device 100.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 may include one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor component 110 and/or 210) may include any of a wide variety of commercially available processors, employing any of a wide variety of technologies and implemented with one or more cores physically combined in any of a number of ways.

As previously discussed, the storage 960 (corresponding to the storage 130 and/or 230) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interface 160 and/or 260) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network or an interconnected set of networks. In recognition of the often greatly different character of multiple types of signaling and/or protocols that must often be supported by any one computing device, the interface 990 is depicted as including multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless signaling, timings and/or protocols to access other computing devices through the depicted network 300 (perhaps a network made up of one or more links, smaller networks, or perhaps the Internet). The interface 995*c* may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, sounds, laser printers, inkjet printers, mechanical robots, milling machines, etc.

Where a computing device is communicatively coupled to (or perhaps, actually incorporates) a display (e.g., the depicted example display 980, corresponding to the display 150 and/or 250), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus for a wearable computing device configured to project images, the apparatus including a projector to project an image; a sensor to generate output; and a projection coordinator operably coupled to the projector and the sensor, the projection coordinator to determine a visual field based at least in part on the sensor output; and generate a projector control directive to cause the projector to project the image onto a surface in the visual field.

Example 2

The apparatus of example 1, the sensor to generate context information for a user of a device, the projection coordinator to generate the projection control directive based in part on the context information.

Example 3

The apparatus of example 1, wherein the sensor is a first sensor, the apparatus comprising a second sensor operably coupled to the projection coordinator, the second sensor to generate context information for a user of a device, the projection coordinator to generate the projection control directive based in part on the context information.

Example 4

The apparatus of example 1, the sensor further comprising one or more of an eye tracking device, a camera, or a light detector, the projection coordinator to determine the visual field based on signals received from the eye tracking device, the camera, or the light detector.

Example 5

The apparatus of example 1, wherein the sensor is a sensor array, the sensor array including a touch input device, the projection coordinator to generate the projector control directive further based in part on signals received from the touch input device.

Example 6

The apparatus of example 1, comprising a camera operably coupled to the projection coordinator, the projection coordinator to generate context information including an indication of a social setting based in part on an image captured by the camera and to generate the projection control directive based in part on the social setting.

Example 7

The apparatus of example 1, the sensor to generate context information for a user, the sensor to comprise an accelerometer to generate the context information indicating an activity level of the user, the projection coordinator to generate the projection control directive based in part on the context information.

Example 8

The apparatus of example 1, the sensor to generate context information for a device, the sensor to comprise a global positioning system (GPS) sensor to generate the context information indicating a location of the device, and the projection coordinator to generate the projection control directive based in part on the context information.

Example 9

The apparatus of any one of examples 2 to 8, comprising a context engine to receive the context information from a network connected computing device.

Example 10

The apparatus of any one of examples 2 to 8, comprising a context engine to determine the context information based on the sensor output.

Example 11

The apparatus of example 1, the projection coordinator to generate the projector control directive further based in part on life-logging information, the life-logging information including an indication of a history of a device based in part on the sensor output.

Example 12

The apparatus of example 1, comprising a camera operably coupled to the projection coordinator, the projection coordinator to generate the projector control directive further based in part on life-logging information, the life-logging information including an indication of a history of a device based in part on an image captured by the camera.

Example 13

The apparatus of example 12, the projection coordinator to generate the projector control directive further based in part on an object recognized in the image captured by the camera.

Example 14

The apparatus of example 13, comprising an object awareness engine to receive an indication of the recognized object from a network connected computing device.

Example 15

The apparatus of any one of examples 11 to 14, comprising a life logging engine to receive the life logging information from a network connected computing device.

Example 16

The apparatus of any one of examples 11 to 14, comprising a life logging engine to determine the life logging information based on the sensor output.

Example 17

The apparatus of any one of examples 12 to 14, comprising a life logging engine to determine the life logging information based on the image captured by the camera.

Example 18

The apparatus of example 1, comprising a surface detector operably coupled to the projection coordinator, the surface detector to detect one or more surfaces adjacent to the apparatus.

Example 19

The apparatus of example 18, comprising a camera operably coupled to the projection coordinator and the surface detector, the surface detector to detect the one or more surfaces based on an image captured by the camera.

Example 20

The apparatus of any one of examples 18 to 19, the projection coordinator to determine the surface on which to project the image from the one or more detected surfaces based at least in part on context information.

Example 21

The apparatus of example 20, the context information to include an indication of the visual field, the projection coordinator to determine the surface from the one or more detected surfaces based on the visual field.

Example 22

The apparatus of any one of examples 1 to 21, the projector control directive to include at least one of an indication of an orientation, a keystone correction, or an optimal color palette.

Example 23

The apparatus of any one of examples 1 to 21, wherein the apparatus is a wearable computing device.

Example 24

The apparatus of any one of examples 1 to 21, wherein the wearable computing device comprises a ring, a watch, a necklace, a bracelet, eyeglasses, a belt, a shoe, a glove, a hat, an earpiece, an earring, a prosthesis, or removable clothing.

Example 25

The apparatus of any one of examples 1 to 21, wherein the visual field is a geographic range capable of perception by a user of a device.

Example 26

A method implemented by a wearable computing device configured to project images, the method including detecting one or more surfaces; determining a one of the one or more detected surfaces in a visual field based at least in part on output from a sensor; and generating a projector control directive to cause a projector to project an image onto the surface in the visual field.

Example 27

The method of example 26, comprising determining the visual field based on signals received from one or more of an eye tracking device, a camera, or a light detector.

Example 28

The method of example 26, comprising detecting the one or more surfaces based on an image captured by a camera.

Example 29

The method of example 26, wherein the sensor is a sensor array, the sensor array including a touch input device, the method comprising generating the projector control directive further based in part on signals received from the touch input device.

Example 30

The method of example 26, comprising receiving context information for a user of a device, the context information based on output from the sensor.

Example 31

The method of example 26, comprising receiving context information, the context information to include an indication of a social setting based in part on an image captured by a camera.

Example 32

The method of example 26, the sensor to comprise an accelerometer, the method comprising receiving context information indicating an activity level of a user based on output from the accelerometer.

Example 33

The method of example 26, the sensor to comprise a global positioning system (GPS) sensor, method comprising receiving context information including an indication of a location of a device based on output from the GPS sensor.

Example 34

The method of any one of example 30 to 33, comprising receiving the context information from a network connected computing device.

Example 35

The method of any one of examples 30 to 33, comprising determining the context information based on the sensor output.

Example 36

The method of example 26, comprising generating the projector control directive further based in part on life-logging information, the life-logging information including an indication of a history of the apparatus based in part on the sensor output.

Example 37

The method of example 26, comprising generating the projector control directive further based in part on life-logging information, the life-logging information including an indication of a history of the apparatus based in part on an image captured by an camera.

Example 38

The method of example 37, comprising generating the projector control directive further based in part on an object recognized in the image captured by the camera.

Example 39

The method of example 38, comprising receiving an indication of the recognized object from a network connected computing device.

Example 40

The method of any one of example 36 to 39, comprising receiving the life logging information from a network connected computing device.

Example 41

The method of any one of examples 36 to 39, comprising determining the life logging information based on the sensor output.

Example 42

The method of any one of examples 36 to 39, comprising determining the life logging information based on the image captured by the camera.

Example 43

The method of any one of examples 30 to 33, comprising determining the surface from the one or more detected surfaces based at least in part on the context.

Example 44

The method of example 43, the context to include an indication of the visual field, the method comprising determining the surface from the one or more detected surfaces based on the visual field.

Example 45

The method of any one of examples 26 to 44, wherein the visual field is a geographic range capable of perception by a user of a device.

Example 46

The method of any one of examples 26 to 44, the projector control directive to include at least one of an indication of an orientation, a keystone correction, or an optimal color palette.

Example 47

At least one machine readable medium comprising a plurality of instructions that in response to being executed on a wearable computing device configured to project images causes the wearable computing device to perform the method of any of examples 26 to 46.

Example 48

An apparatus for a wearable computing device configured to project images, the apparatus including a processor; a projector operably connected to the processor; and a memory comprising a plurality of instructions that in response to being executed by the processor cause the projector project an image onto a surface according to the method of any one of examples 26 to 46.

Example 49

An apparatus for a wearable computing device configured to project images, the apparatus including means for detecting one or more surfaces; means for determining a one of the one or more detected surfaces in a visual field based at least in part on output from a sensor; and means for generating a projector control directive to cause a projector to project an image onto the surface in the visual field.

Example 50

The apparatus of example 49, comprising means for determining the visual field based on signals received from one or more of an eye tracking device, a camera, or a light detector.

Example 51

The apparatus of example 49, comprising means for detecting the one or more surfaces based on an image captured by a camera.

Example 52

The apparatus of example 49, wherein the sensor is a sensor array, the sensor array including a touch input device, the apparatus comprising means for generating the projector control directive further based in part on signals received from the touch input device.

Example 53

The apparatus of example 49, comprising means for receiving context information for a user of a device, the context information based on output from the sensor.

Example 54

The apparatus of example 49, comprising means for receiving context information, the context information to include an indication of a social setting based in part on an image captured by a camera.

Example 55

The apparatus of example 49, the sensor to comprise an accelerometer, the apparatus comprising means for receiving context information indicating an activity level of a user based on output from the accelerometer.

Example 56

The apparatus of example 49, the sensor to comprise a global positioning system (GPS) sensor, the apparatus comprising means for receiving context information including an indication of a location of a device based on output from the GPS sensor.

Example 57

The apparatus of any one of examples 53 to 56, comprising means for receiving the context information from a network connected computing device.

Example 58

The apparatus of any one of examples 53 to 56, comprising means for determining the context information based on the sensor output.

Example 59

The apparatus of example 49, comprising means for generating the projector control directive further based in part on life-logging information, the life-logging information including an indication of a history of the apparatus based in part on the sensor output.

Example 60

The apparatus of example 49, comprising means for generating the projector control directive further based in part on life-logging information, the life-logging information including an indication of a history of the apparatus based in part on an image captured by an camera.

Example 61

The apparatus of example 60, comprising means for generating the projector control directive further based in part on an object recognized in the image captured by the camera.

Example 62

The apparatus of example 61, comprising means for receiving an indication of the recognized object from a network connected computing device.

Example 63

The apparatus of any one of examples 59 to 62, comprising means for receiving the life logging information from a network connected computing device.

Example 64

The apparatus of any one of examples 59 to 62, comprising means for determining the life logging information based on the sensor output.

Example 65

The apparatus of any one of examples 59 to 62, comprising means for determining the life logging information based on the image captured by the camera.

Example 66

The apparatus of any one of examples 59 to 62, comprising means for determining the surface from the one or more detected surfaces based at least in part on the context.

Example 67

The apparatus of example 66, the context to include an indication of the visual field, the apparatus comprising means for determining the surface from the one or more detected surfaces based on the visual field.

Example 68

The apparatus of any one of examples 48 to 67, wherein the visual field is a geographic range capable of perception by a user of a device.

Example 69

The apparatus of any one of examples 48 to 67, the projector control directive to include at least one of an indication of an orientation, a keystone correction, or an optimal color palette.

What is claimed is:
1. An apparatus for a wearable computing device comprising:
   a projector to project an image;
   a sensor to generate output; and
   a projection coordinator operably coupled to the projector and the sensor, the projection coordinator to:
      determine a visual field based at least in part on the sensor output;
      generate a projector control directive based in part on life-logging information including a history of an object based in part on the sensor output, the projector control directive to cause the projector to project the image onto a surface in the visual field, the image to include an indicator highlighting the object within a field of view; and generate a control directive to cause the projector to project a direction image to retrace a course recorded in the life-logging information.

2. The apparatus of claim 1, comprising a camera operably coupled to the projection coordinator, the projection coordinator to generate context information including an indication of a social setting based in part on an image captured by the camera and to generate the projection control directive based in part on the social setting.

3. The apparatus of claim 1, the sensor to generate context information and the projection coordinator to generate the projection control directive based in part on the context information, the sensor to comprise an accelerometer to generate the context information indicating an activity level of a user or the sensor to comprise a global positioning system (GPS) sensor to generate the context information indicating a location of a device.

4. The apparatus of claim 1, comprising a camera operably coupled to the projection coordinator, the projection coordinator to generate the projector control directive further based in part on life-logging information, the life-logging information including an indication of a history of a device based in part on an image captured by the camera.

5. The apparatus of claim 4, the projection coordinator to generate the projector control directive further based in part on an object recognized in the image captured by the camera.

6. The apparatus of claim 5, comprising an object awareness engine to receive an indication of the recognized object from a network connected computing device.

7. The apparatus of claim 1, comprising a surface detector operably coupled to the projection coordinator, the surface detector to detect one or more surfaces adjacent to the apparatus.

8. The apparatus of claim 7, comprising a camera operably coupled to the projection coordinator and the surface detector, the surface detector to detect the one or more surfaces based on an image captured by the camera, the surface detector to detect the one or more surfaces based on a characteristic comprising at least one of flat, matte, or coloring.

9. The apparatus of claim 7, the projection coordinator to determine the surface on which to project the image from the one or more detected surfaces based at least in part on context information.

10. The apparatus of claim 1, the projector control directive to include at least one of an indication of an orientation, a keystone correction, or an optimal color palette.

11. The apparatus of claim 1, the sensor to generate context information indicating a location of a user, the projection coordinator to generate a control directive to cause the projector to project a direction image to provide a visual indication of a direction of travel for the user to take based on the location of the user.

12. The apparatus of claim 1, the direction image comprising an arrow projected on a walking surface.

13. At least one non-transitory machine readable medium comprising a plurality of instructions that in response to being executed on a wearable computing device cause the wearable computing device to:
    detect one or more surfaces;
    determine a one of the one or more detected surfaces in a visual field based at least in part on output from a sensor;
    generate a projector control directive based in part on life-logging information including a history of an object based in part on the sensor output, the projector control directive to cause a projector to project an image onto the surface in the visual field, the image to include an indicator highlighting the object within a field of view; and
    generate a control directive to cause the projector to project a direction image to retrace a course recorded in the life-logging information.

14. The at least one non-transitory machine readable medium of claim 13, wherein execution of the plurality of instructions further causes the wearable computing device to detect the one or more surfaces based on an image captured by a camera.

15. The at least one non-transitory machine readable medium of claim 13, wherein execution of the plurality of instructions further causes the wearable computing device to receive context information for a user of a device, the context information based on output from the sensor.

16. The at least one non-transitory machine readable medium of claim 15, wherein execution of the plurality of instructions further causes the wearable computing device to determine the surface from the one or more detected surfaces based at least in part on the context.

17. A method implemented by a wearable computing device, the method comprising:
    detecting one or more surfaces;
    determining a visual field based on output from a first sensor;
    determining a one of the one or more detected surfaces in the visual field based at least in part on output from a second sensor;
    generating a projector control directive based in part on life-logging information including a history of an object based in part on the sensor output, the projector control directive to cause a projector to project an image onto the surface in the visual field, the image to include an indicator highlighting the object within a field of view; and
    generate a control directive to cause the projector to project a direction image to retrace a course recorded in the life-logging information.

18. The method of claim 17, the life-logging information including the history of the object based in part on an image captured by a camera.

19. The method of claim 18, comprising generating the projector control directive further based in part on the object recognized in the image captured by the camera.

* * * * *